United States Patent [19]
Cherin et al.

[11] 4,142,776
[45] Mar. 6, 1979

[54] OPTICAL FIBER RIBBON CARTRIDGE CONNECTOR

[75] Inventors: Allen H. Cherin, Doraville; Anthony Osborne, Duluth, both of Ga.

[73] Assignee: Bell Telephone Laboratories, Incorporated, Murray Hill, N.J.

[21] Appl. No.: 724,653

[22] Filed: Sep. 20, 1976

[51] Int. Cl.$^2$ .............................................. G02B 5/14
[52] U.S. Cl. ................................................. 350/96.21
[58] Field of Search ............... 350/96 C, 96 B, 96.21, 350/96.22

[56] References Cited

U.S. PATENT DOCUMENTS

| | | | |
|---|---|---|---|
| 3,846,010 | 11/1974 | Love et al. ................... | 350/96 C |
| 3,861,781 | 1/1975 | Hasegawa et al. ............. | 350/96.21 |
| 3,864,018 | 2/1975 | Miller ........................... | 350/96 C |
| 3,871,935 | 3/1975 | Gloge et al. ................... | 350/96 C |

OTHER PUBLICATIONS

"Optical Waveguide Cable Connection" by Thiel et al., Applied Optics, vol. 15, No. 11, Nov. 1976.
"Low Loss Splicing and Connection of Optical Waveguide Cables" by Hawk et al., SPIE vol. 63 (1975), Guided Optical Communications.

*Primary Examiner*—John K. Corbin
*Assistant Examiner*—Stewart Levy
*Attorney, Agent, or Firm*—Charles E. Graves

[57] ABSTRACT

Two groups of optical communications fibers are optically joined within a single cartridge that receives and abuts two optical fiber ribbon end arrays. A two-piece connector consisting of a substrate with fiber-receiving grooves and a mating cover houses the fibers. In turn two such connectors are contained within the cartridge, either in a tight fit requiring no retaining means or a loose fit requiring set screws to retain the two connectors in abutting relation. Variations of the basic hardware provide both a rearrangeable splice and a permanent splice. Several cartridges may be housed in a fixture to accommodate the several layers of a multi-layer optical fiber ribbon cable.

7 Claims, 12 Drawing Figures

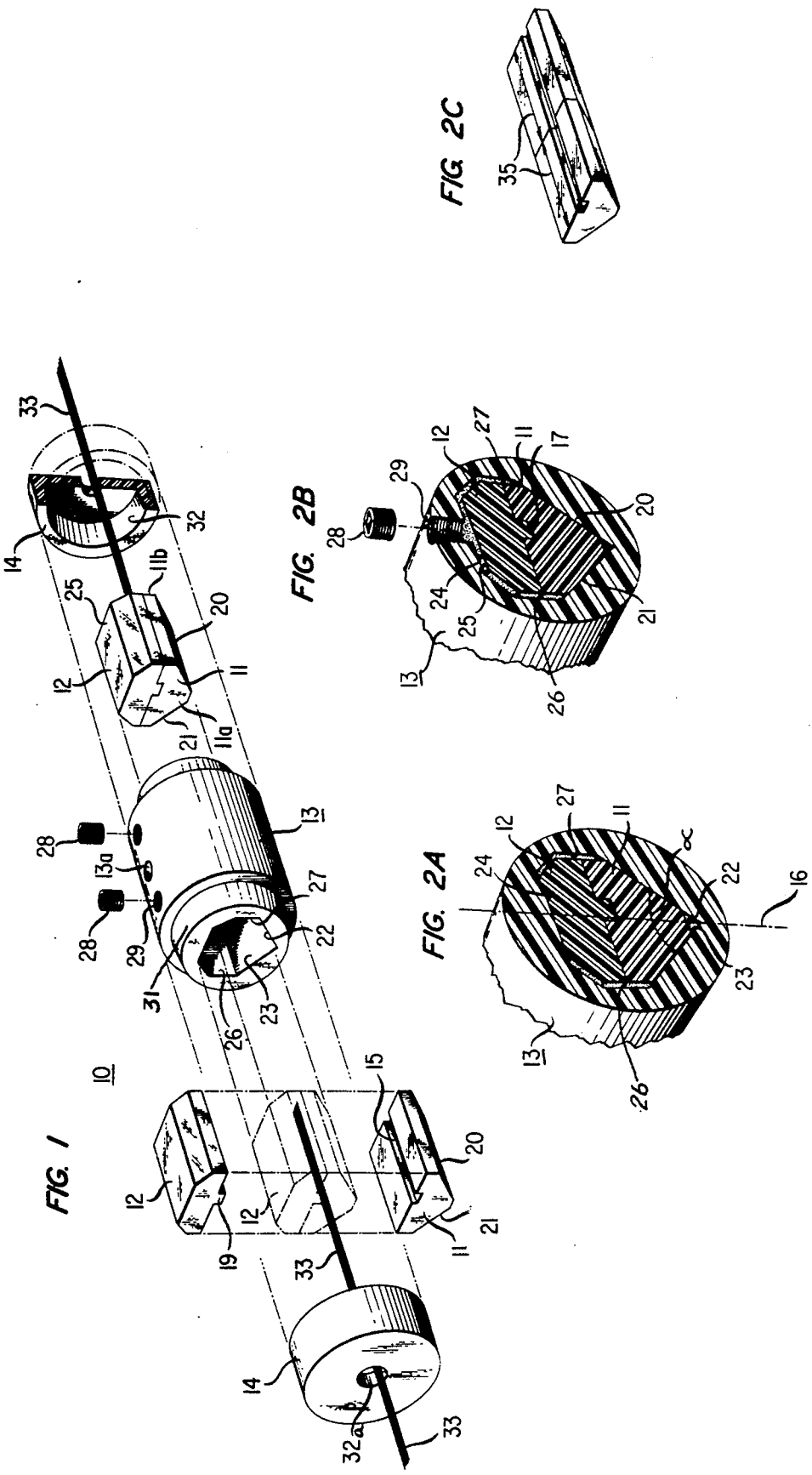

OPTICAL FIBER RIBBON CARTRIDGE CONNECTOR

FIELD OF THE INVENTION

This invention relates to the splicing or optical joining of several optical fibers of a first group to corresponding fibers of a second group.

BACKGROUND OF THE INVENTION

With the introduction of optical fibers into the communications network, particularly the outside cable plant, a critical need for accurate, reliable, easy-to-use splicing hardware has arisen. Accuracy in this context entails basically the precise axial alignment and end abutment of corresponding fibers. Reliability includes the permanence of the splice once effected and the repeatability from splice to splice of the desired high-level of optical coupling between corresponding fibers. Ease of use involves effecting gang splices in the field using a minimum of steps, each simple and requiring no great dexterity.

Splicing hardware to achieve the foregoing, must accommodate optical fibers contained within a series of stacked ribbon structures, since the ribbon stack is preferred as a multifiber unit. The ribbons contain a number, for example 12, of equally spaced, parallel fibers. The ribbons of a stack must be capable of being fanned out and selectively connected to other ribbon structures. Additionally, there is need for both a rearrangeable splice and a permanent splice in the joining of optical fiber ribbons or cables made up of a plurality of ribbons.

SUMMARY OF THE INVENTION

A fiber optic ribbon cartridge connector has been devised which fulfills the foregoing needs. The connector proper consists of a substrate with fiber-receiving grooves, and a mating cover. Two fiber ribbons to be spliced are each mounted, advantageously, in a separate such connector, with one fiber contained in each groove and with the fiber ends and the corresponding end of their host connector being coplanar. These connectors are inserted into opposite ends of a cartridge and optically coupled by abutting the opposing ends. Reference surfaces on the connectors cooperate with like surfaces within the cartridge, to bring the respective mating pairs of fiber ends into axial alignment.

The connectors are maintained in alignment and abutment within the cartridge by a tight fit of the connectors in the cartridge or by set screws or the equivalent. The ribbons can be optically decoupled by separating the two connectors while, if desired, still retaining them in their cartridge.

Desirably the fiber-receiving grooves of each substrate are offset to one side of the vertical center plane of the substrate. The offset affords a ready, visual indicator to the splice assembler as to which ends of the two substrates are the proper ones to be abutted, in order to prevent tolerance build-up which can result in fiber misalignment.

The transverse alignment of two connectors within the cartridge body is advantageously achieved by registration of two converging planar bottom reference surfaces of the connector body with matching V-shaped floor planes of the cartridge body. A tight or essentially zero clearance fit may be realized between the top surface of the cover and the roof of the cartridge body, requiring relatively precise dimensional control of these components. Alternatively, dimensional control may be somewhat relaxed by the provision of a clearance zone between the roof of the cartridge body and top of the connector cover. In this instance, securing means such as the mentioned set screws assure that the connector and cartridge reference surfaces of the connector are kept in registration.

By using the described connectors with a fixture for receiving a number of cartridges, a splice of all corresponding ribbons between a first and a second cable can be conveniently achieved. The ribbon connections can be rearranged, if desired, by different pairings of, for example, the connectors of the first cable with those of the second.

The invention and its further objects, features and advantages will be readily comprehended from a reading of the detailed description to follow of illustrative embodiments.

DESCRIPTION OF THE DRAWING

FIG. 1 is an exploded assembly view of an optical fiber connector pursuant to the invention;

FIG. 2A and FIG. 2B are schematic sectional side views showing two versions of the optical fiber connector, one a tight fit and the other a loose fit;

FIG. 2C shows schematically an alternate end identification means;

DETAILED DESCRIPTION OF ILLUSTRATIVE EMBODIMENT

Figure 3:
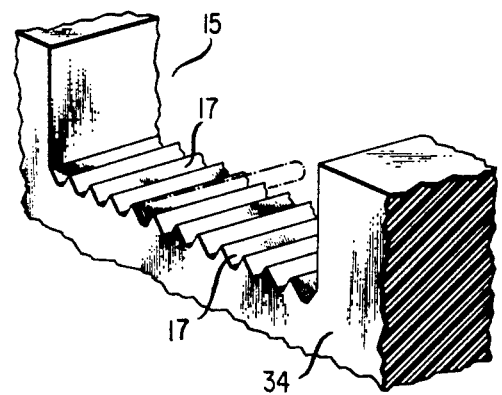
FIG. 3 is a partial schematic frontal view of a fiber-receiving substrate.

FIG. 1 depicts hardware pursuant to one inventive embodiment which achieves a re-enterable optical fiber ribbon splice. The numeral 10 denotes an optical fiber ribbon connector consisting of a fiber-receiving substrate 11, a substrate cover 12, a chambered cartridge 13 which receives two substrate-cover assemblies to be mated, and two end caps 14. Substrate 11 comprises a cavity 15 running lengthwise and including a number of V-shaped parallel fiber-receiving grooves 17 as seen in FIG. 2B, and two planar bottom reference surfaces 20, 21, disposed at an angle denoted α to each other as seen in FIG. 2A.

The grooved cavity 15 is intentionally not centered with respect to the plane 16 which bisects the angle α, but instead is offset a visible amount to one side or the other of plane 16. The visible offset provides one means, pursuant to one aspect of the invention, for separately identifying the substrate ends. Thus, in end view, the substrate 11 illustrated in FIG. 2A is seen to have its cavity 15 offset toward the right of plane 16, in which orientation lower substrate end 11a is distinguishable from upper substrate end 11b.

The desirability of making such distinction lies in the fact that any constant inaccuracy in the transverse location of grooved cavity 15 in a batch of substrates 11 will be effectively doubled if the improper ends of two substrates are abutted. As a result any two fibers in corresponding grooves will be axially misaligned by twice the amount of transverse inaccuracy, causing optical energy loss at such a splice. These losses are cumulative in a series connection of several such transversely misaligned fibers. But by following a system of always matching an "a" end to a "b" end in the splicing operation, any constant transverse location inaccuracy is cancelled.

The offset grooved cavity 15 is one means of providing the coding to identify the ends. Other means, for example, including alignment marks on the side of all substrates such as the arrows 35 of FIG. 2C, can be envisioned for achieving the same end. The grooves 17 are of such depth and angularity that, when optical fibers 18 are placed therein, the fiber tops are approximately even with or slightly above the apexes formed by adjacent grooves. The ridge 19, which extends from cover 12 to mate with the substrate cavity 15, touches the fibers 18.

In one embodiment shown in FIG. 2A the substrate 11 and cover 12 when assembled exhibit from zero clearance to an interference fit with respect to the reference surfaces 22, 23, 24 of the cartridge 13. In a further embodiment portrayed in FIG. 2B a slight clearance is provided between the surface 24 and the top 25 of cover 12. In both options, as seen in FIGS. 2A and 2B a clearance is provided beteen the sides 26, 27 of the cartridge 13 and the corresponding sides of the substrate-cover assembly. To set the substrate reference surfaces 20, 21 firmly against the cartridge reference surfaces 22, 23, in the loose fit option, set screws 28 mounted in machine thread holes 29 of the cartridge 13, are engaged to force the top 25 of the cover 12 downwardly.

Figure 9:
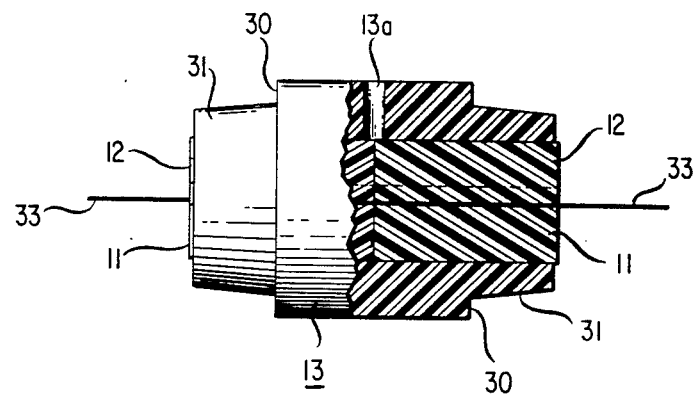
FIG. 9 is a side view in partial section showing two optical fiber connectors assembled in end-abutting relation in a cartridge body.

The outer surface of cartridge 13 advantageously is cylindrical, but as seen in FIG. 9 the ends are reduced in diameter at locations 30 and then provided with a bevel 31. Cap 14 as seen in partial cross-section in FIG. 1 has the same outside diameter as does cartridge 13 and in addition is provided with an interior bevel 32, corresponding to bevel 31 of the cartridge. The end caps 14 have a central orifice 32a through which an optical fiber ribbon 33 is mounted.

Advantageously, each of these parts so far described are fabricated by injection molding to ensure achievement of required tight tolerances. The planar reference surfaces 20, 21 of substrate 11, for example, must be highly flat and disposed at the same V-angle with respect to each other as are the reference surfaces 22, 23, of cartridge 13 with which they mate.

Figure 10:
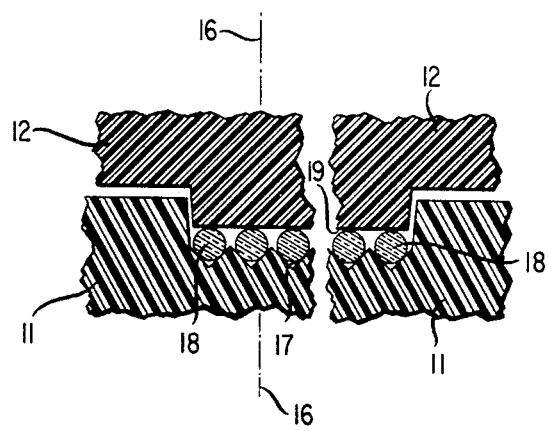
FIG. 10 is a partial end sectional view showing fibers located in the receiving grooves of a substrate of FIG. 2B with the cover plate in place.

Use of the optical fiber connector depicted in FIG. 1 requires that the enveloping ribbon structure be stripped back to expose the parallel fibers 18 at their ends as seen in FIG. 10. The fibers are then placed in receiving grooves 17 such that their ends are roughly coincident with the end 34 of the substrate 11 as depicted in FIG. 3. The cover 12 is then applied, producing the end configuration depicted in FIG. 10. As a final step, the cover-substrate assembly is cemented together and given an end polish rendering the end surface, including the fiber ends, optically flat. An alternative end preparation occasionally preferable to polishing is to cut the fiber ends prior to assembly and then to assemble them with the cut ends in the same plane as the connector end. Similar preparation is given to a second substrate, cover, and fiber ribbon assembly. These two assemblies are then inserted into the cartridge 13 until they abut as shown in FIG. 9. Refractive index matching material may be added through orifice 13a. If the configuration is a tight fit as described above, no set screws are required; otherwise the set screws are engaged. Finally, the end caps 14 are added and secured lightly with cement if desired.

The foregoing describes a re-enterable splice in that the two cover assemblies which are joined in an optical connection may be disconnected and reconnected elsewhere.

Figure 4:
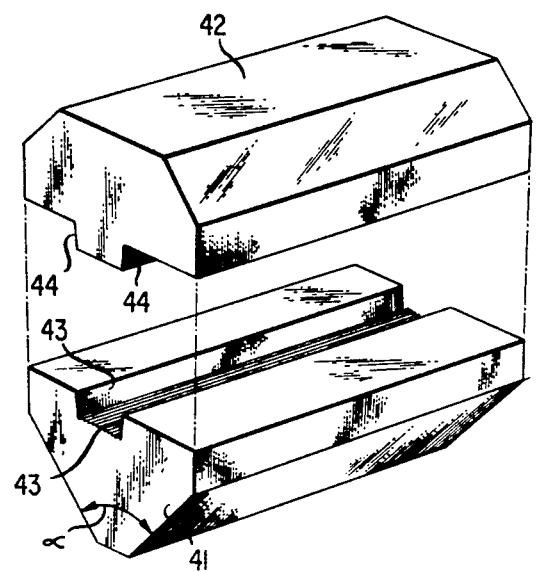
FIG. 4 is a frontal perspective view showing in exploded form an optical fiber connector comprising a cover and a substrate.

In a further embodiment of the invention a connection such as depicted in FIG. 4 may be used to achieve a permanent splice. In this embodiment a substrate 41 is provided with continuous grooves. A mating cover 42 holds fibers in position in the respective grooves. In this case the grooves are continuous along the length of the substrate 41 and contain the two ends of the ribbons to be connected. The sides 43 of the groove cavity in substrate 41 may be tapered outwardly to match an inward taper of the sides 44 of the insert of cover 42. Preparation of the ribbons for use in this splice requires that the ribbon ends be carefully squared so that they all abut at the same time. Once this connector is assembled it may be permanently glued. Since these do not require a body such as cartridge 13 for alignment, the assembled connector depicted in FIG. 4 may be used by itself or housed in a loose fitting body, not shown.

Figure 5:
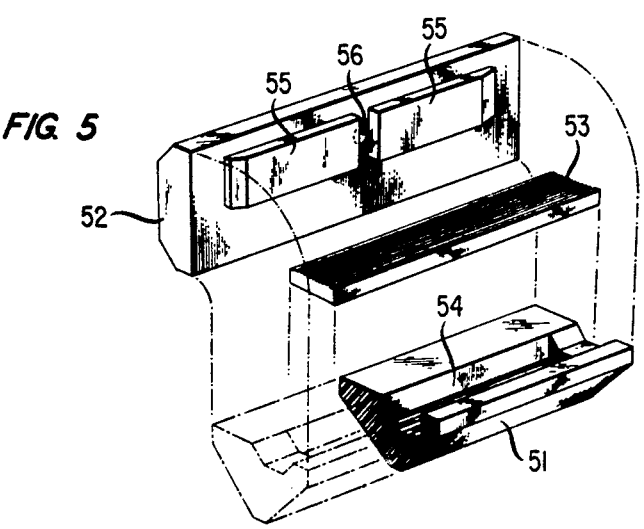
FIG. 5 is a side perspective view showing an alternative version of the fiber-receiving substrate and mating cover, in which the grooves are formed by etching of a silicon chip.

FIG. 5 illustrates a variation of the FIG. 4 permanent splice comprising substrate 51 and cover 52 in which the parallel fiber-receiving grooves are formed on a separate insert 53. Highly precise dimensional control of the groove geometry may be achieved by fabricating the insert 53 of an etchable material such as silicon and etching the grooves by well-known processes. The insert 53 fits in a recess 54 of the substrate. Fibers are prepared as in the FIG. 4 embodiment and placed with abutting alignment in the grooves of insert 53. Advantageously, although not necessarily, the fibers fit into the insert grooves so that the fiber tops are at the same height as the apexes which separate the grooves. The cover 52 includes two extenders 55 which may be compliant, and which engage the fibers to secure them in abutting positions. Index matching material may be supplied through passage 56 and thereafter the cover 52 and substrate 51 are permanently cemented together.

Figure 6:
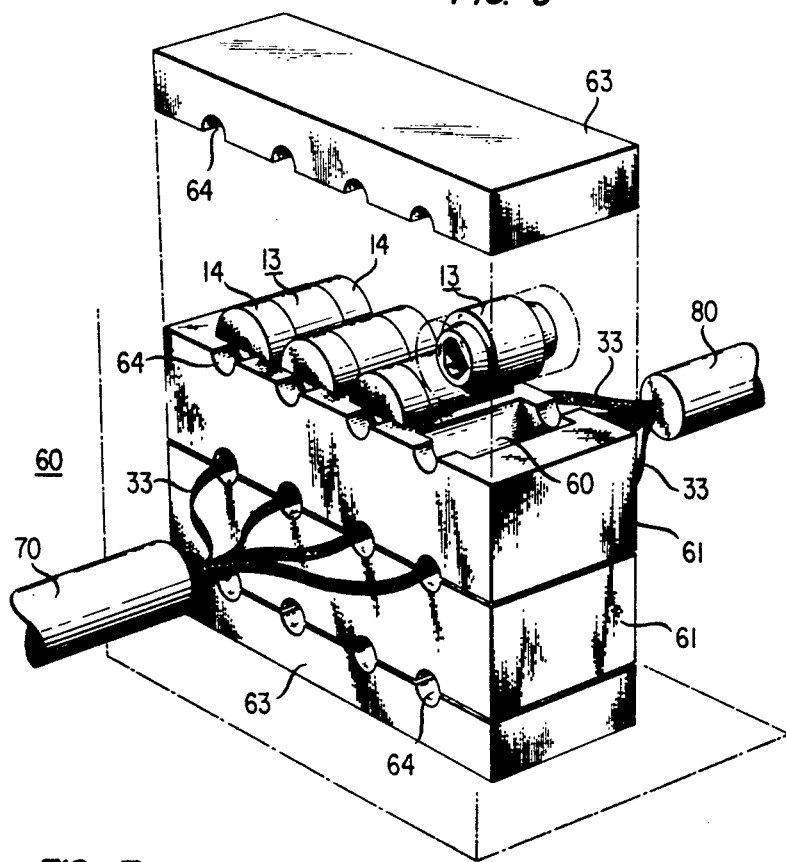
FIG. 6 is a frontal schematic perspective view showing a connector cartridge holding fixture.

FIG. 6 illustrates a holder 60 for assembled connector cartridges. Holder 60 consists of several stacked modules 61 each formed on top and bottom with plural side-by-side semicylindrical chambers 62 for receiving cartridges of rearrangeable splicing hardware as illustrated in FIG. 1. The end members 63 of holder 60 are essentially two halves of one of the modules 61. Ribbon entrance corridors 64 connect the chambers 62 to the holder exterior. The modules 61 and end members 63 are secured by any convenient means such as pinning or a tack glue. Aligning of adjacent modules is provided by the fit of the cartridges in the adjacent semicylindrical chambers 62.

Holder 60 will accommodate a number, for example, twelve of connector cartridges. A typical number of fibers per ribbon is also twelve; and thus, 144 fibers of a first optical fiber cable 70 may be joined in holder 60 to 144 fibers of a second optical cable 80. Since the splices may be rearrangeable, any one fiber ribbon of the cable 70 may be selectively spliced to any of the fiber ribbons of the second cable. Also, if desired, pairs of ribbons from a one cable may be spliced together in the apparatus shown by looping one of the ribbons around the far side of the holder 60. The use of end caps on the cartridge when housing them in holder 60 is optional, since the connector assembly is held in the cartridge by the holder wall adjacent the corridor 64.

Figure 7:
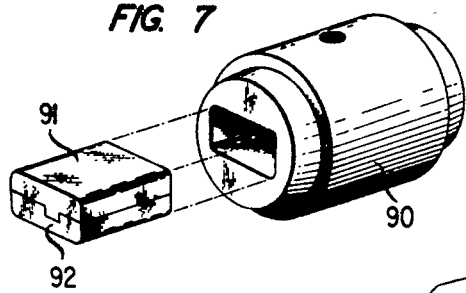
FIG. 7 is a frontal schematic diagram depicting a connector body adapted to receive in a rectangular chamber a like-shaped two-piece optical figer connector.

FIG. 7 illustrates a further variation of cartridge connection in which the cartridge 90 includes a rectangular slot. Since a modest interference fit between the connector 91 is contemplated, dimensional control must be carefully maintained within tight tolerances. This embodiment also uses the offset grooved chamber in the substrate 92 as one means of identifying connector ends.

Figure 8:
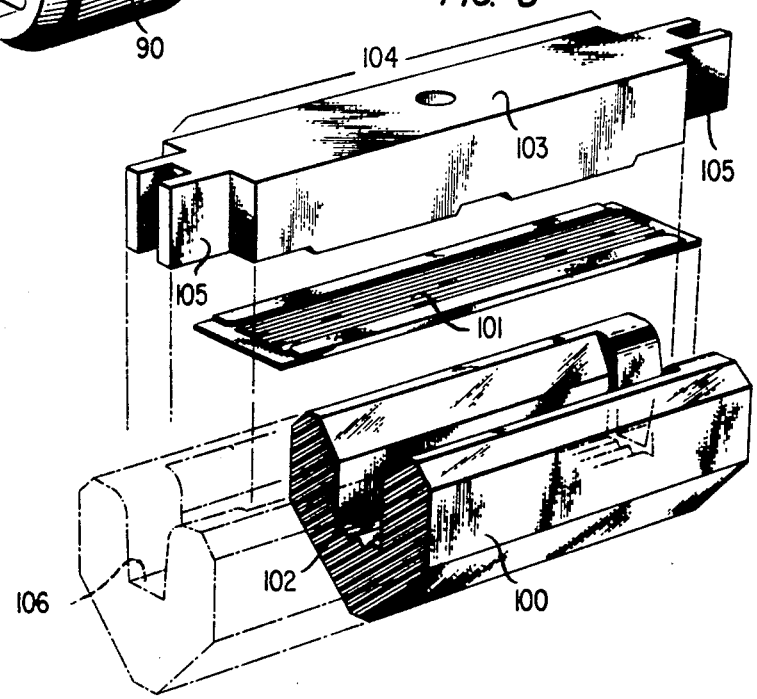
FIG. 8 shows a variant on the subject matter of FIG. 5.

The embodiment portrayed in FIG. 8 is similar in function to that of FIG. 5 in that a substrate 100 receives a grooved chip 101 in a cavity 102. A cover 103 has a body portion 104 that fits into the cavity 102, and extending end portions 105 which capture the fiber ribbon exterior at the entrances 106 to provide strain relief.

The spirit of the invention is embraced in the scope of the claims to follow.

What is claimed is:

1. Apparatus for connecting a first linear array of optical fibers to a second linear array, comprising:
   first and second connectors each comprising:
   a substrate having a lengthwise-running cavity with spaced, parallel fiber-receiving grooves in its floor;
   a cover including an insert for mating engagement in said cavity, for containing fibers in said grooves;
   means for consistently distinguishing between the two ends of each substrate;
   a cartridge having an interior chamber of uniform cross-section for receiving said first and second connectors, said cartridge having reference surfaces for registration with corresponding reference surfaces on said substrate.

2. Apparatus pursuant to claim 1 wherein said reference surfaces in said cartridge and on said substrate consist in each instance of two planar surfaces disposed with respect to each other at the same angle, with said planar surfaces of said cartridge actually intersecting.

3. Apparatus pursuant to claim 2 wherein said distinguishing means comprises offset of said substrate cavity with respect to a plane bisecting the reference surfaces of said substrate.

4. Apparatus pursuant to claim 3 wherein said each cover includes a flat top and wherein said cartridge interior includes a flat ceiling.

5. Apparatus pursuant to claim 4 wherein said connectors each comprise a said substrate and a said cover fit into said cartridge by engagement of said reference surfaces leaving a clearance between said cartridge ceiling and the top of said cover, said cartridge further comprising means operable from the cartridge exterior for mechanically engaging each said cover top to maintain said reference surfaces together.

6. Apparatus pursuant to claim 4 wherein said connectors each comprise a substrate and a cover fit into said cartridge tightly by engagement of said reference surfaces and of said cartridge ceiling with said cover roof.

7. A splice between a first and a second optical fiber ribbon comprising:
   first and second connectors, each comprising:
   a substrate having an upper exterior surface with a lengthwise-running cavity, said cavity having a floor with spaced parallel fiber-receiving grooves; and lower portion comprising two flat bottom reference surfaces disposed at a predetermined angle to each other;
   a cover including a lengthwise-running member extending into said cavity;
   the fibers of said first and second ribbons being contained in respective substrate grooves of the respective said first and second connectors;
   a cartridge including an interior chamber receiving said first and second connectors in end abutting relation, said chamber comprising two flat substrate support surfaces oriented with respect to each other at the said predetermined angle, said cartridge interior also having a flat ceiling;
   means for maintaining said substrate bottom reference surfaces and said cartridge support surfaces in engagement; and
   means for securing said two connectors in end abutting relation.

* * * * *